May 23, 1933.  G. KÖHLER  1,910,802
PRESSURE FLUID REGULATOR
Filed July 24, 1929   2 Sheets-Sheet 1

Inventor
Gustav Köhler
By Knight Bros.

May 23, 1933.  G. KÖHLER  1,910,802
PRESSURE FLUID REGULATOR
Filed July 24, 1929  2 Sheets-Sheet 2

Fig. 3

Inventor
Gustav Köhler,
By Knight Bros.

Patented May 23, 1933

1,910,802

UNITED STATES PATENT OFFICE

GUSTAV KÖHLER, OF MÜLHEIM-RUHR, GERMANY, ASSIGNOR TO SIEMENS-SCHUCKERT-WERKE AKTIENGESELLSCHAFT, OF BERLIN-SIEMENSSTADT, GERMANY, A CORPORATION OF GERMANY

PRESSURE FLUID REGULATOR

Application filed July 24, 1929, Serial No. 380,692, and in Germany July 2, 1928.

My invention relates to improvements in pressure fluid regulators, more particularly for prime movers in which a rotary pump driven by the prime mover furnishes the operating fluid.

The object of my invention is to utilize the fluctuations in the quantity of the liquid delivered by a rotary or centrifugal pump for the adjustment of the regulating members of a regulating device. In the hitherto known regulating devices merely the fluctuations in the pressure have been utilized for adjusting such regulating members. My invention is particularly useful if the height to which the liquid is raised is kept constant. At the same time it is possible to connect to the rotary pump employed for the regulation various consumers such as machine bearings and the servo-motors.

My invention will be better understood by reference to the drawings affixed to my specification and illustrating preferred embodiments.

In the drawings there is shown in

Figures 1, 2:
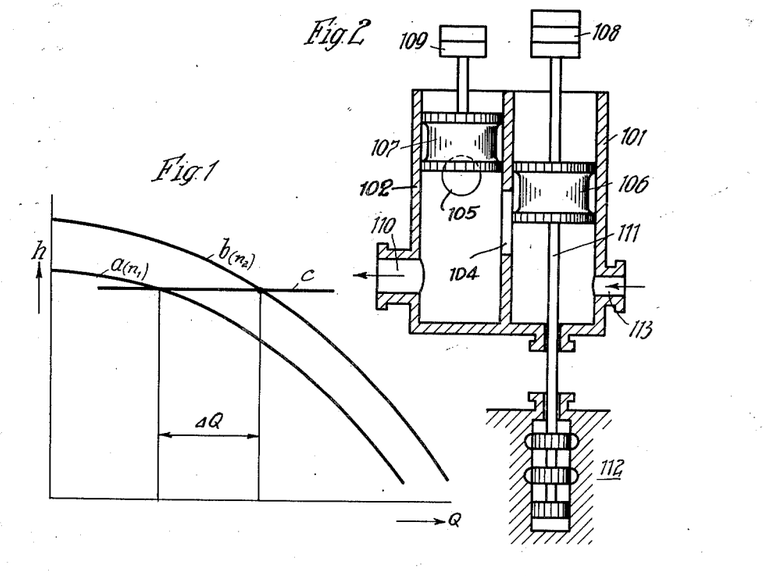
Fig. 1, a diagram characteristic of the working conditions of a rotary pump.
Fig. 2, a longitudinal vertical section through a semi-diagrammatical illustration of an arrangement showing the principle involved in the manner of regulation according to my invention, Fig. 3, a preferred construction of my improved regulating device in longitudinal section and its cooperation with a power plant, and Fig. 4, in longitudinal section a special device by means of which a substantially constant pressure may be maintained in the chamber into which the rotary pump delivers.

Referring to Fig. 1 of the drawings which shows the characteristic of a rotary pump (delivery height $h$ dependent upon the delivered quantity $Q$), the curve $a$ showing the behavior of the pump at a speed $n_1$, curve $b$ the behavior of the pump at a speed $n_2$. If $h$ is kept constant, the transition from one speed to the other takes place according to a line $c$ parallel to the abscissa. How this regulating curve may be realized in an apparatus will be shown with reference to examples. If the regulation takes place according to the line $c$ a definite increase of the quantity $Q$ delivered corresponds unequivocally with a definite increase of the speed $n$. In order to attain at a definite speed variation as strong a regulating motion as possible a comparatively large value of $h$ is chosen.

The type of regulation described thus calls for a device which keeps the delivery pressure of the pump constant in spite of the variation of the speed and which responds to the occurring variation of the quantity delivered. Such a device is illustrated in Fig. 2 of the drawings in more or less diagrammatic fashion for explaining the theory underlying the function of my invention. The oil from the delivery pump (not shown) is here first conducted into a cylinder 101 through the inlet 113 and then passes into a cylinder 102 through a port 104, essential for the control if the oil consumers are to be supplied at constant pressure. An auxiliary discharge port 105 is provided in cylinder 102. There is provided a further main discharge opening 110 through which the main portion of the oil delivered flows to the consumers. These consumers, as mentioned at the beginning, may comprise the engine bearings and the servo-motors of the plant, which must be supplied with oil at constant pressure. In cylinder 101 is slidingly disposed a piston 106 loaded with a weight 108. In a similar manner a piston 107 loaded with a weight 109 is slidingly disposed in cylinder 102. Piston 106, which is the main piston, regulates the size of port 104, whereas auxiliary piston 107 regulates the size of port 105. The main piston 106 is connected by piston rod 111 to the usual control member for a piston servo-motor only partly illustrated at 112. The servo-motor itself for operating the valves of an assumed prime mover is not shown in this figure. The pump (not shown in Fig. 2) is assumed to be driven by the prime mover at a fixed speed ratio.

At a given speed of the prime mover the pistons 106 and 107 are in equilibrium. The oil flow through the device is in a state of equilibrium on both sides of this 104, the pressure in each cylinder being normally constant, each at a value commensurate with the weight of its piston. It will be understood that, owing to the provision of two ports in cylinder 102, the force acting in the form of a weight 109 on the piston 107 must be smaller than that acting in the form of weight 108 on the piston 106 to maintain this balance. For instance, if the assumed consumers should draw more oil from port 110, which would tend to decrease the pressure in cylinder 102, piston 107 would drop and accordingly restrict auxiliary port 105 to restore the normal balance of pressure.

It is obvious that in any kind of regulating arrangement, a regulating cycle can be initiated only if one of the forces, by which the arrangement is normally held in balance, suffers a change, due to a change in the operating conditions of the system to be regulated, because so long as all forces balance one another no regulation can occur. This changed condition may remain after the equilibrium is reestablished by the changed operating conditions of the controlled machine, or it may disappear after the regulator has exerted the desired influence on the machine. In the system according to the present invention the second mode of operating the regualtor is chosen.

Let us assume that in the example Fig. 2, the speed of the prime mover increases; then the quantity of oil delivered by the pump also increases. This temporarily disturbs the balance between the forces acting in cylinders 101 and 102. The piston 106 in the cylinder 101, due to the temporary increase in pressure, is now raised so far that the port 104 is enlarged sufficiently to discharge into cylinder 102 also the increased amount of oil delivered by the pump into cylinder 101. The increased oil flow into cylinder 102 through the enlarged port 104 tends to increase the pressure in that cylinder, with the result that its piston 109 is raised, which increases the size of port 105, thereby providing a discharge for the increased amount of oil. When this state is attained a state of equilibrium is restored so long as the increased flow prevails. The height of delivery pressure ($h$ in Fig. 1) has remained constant also in cylinder 101 since the oil stands under the constant pressure of the weight 108. The only changes which therefore have occurred are that due to the increased amount of oil delivered into cylinders 101 and 102, pistons 106 and 107 have during the temporary pressure increase in their respective cylinders moved upwardly until the size of their respective ports 104 and 105 are sufficiently increased to take care of the discharge of this added quantity of oil, whereafter the normal pressure in each cylinder is restored. The motion of piston 106 may be directly transmitted to the control member 112 to exert the desired influence upon the prime mover, for instance in a manner to be explained with reference to Fig. 3. The measure of the displacement of the piston 106 is thus a measure for the increase of the quantity Q delivered, and thus a measure of the prime mover speed increase, while the loaded piston 107 takes care that, except during the short period of its motion, the pressure in cylinder 102 is kept constant.

This function of cylinder 102 with its auxiliary port and piston 107 is of great importance for the correct functioning of my novel regulator for several reasons: First it renders the regulator entirely independent of the influences of varying atmospheric pressures. To appreciate the atmospheric pressure effect, let us assume that cylinder 102 be removed entirely and that the oil discharges through port 104 directly into the open atmosphere. Assuming for the moment also a constant supply of oil into cylinder 101 through inlet 113, piston 106 will adjust itself to a height at which port 104 is wide enough to discharge the supplied amount into the atmosphere. Now let us assume an appreciable rise in atmospheric pressure. Since for the delivery of a unit quantity of liquid through a given size orifice also the pressure of the medium into which it is delivered is of importance, this higher pressure prevents the discharge of the same amount of liquid through that size orifice as before, and some of the oil will at first back up in cylinder 101 and increase momentarily the pressure in the latter, thereby raising piston 106 until the piston has increased the size of port 104 to reestablish equilibrium by permitting the discharge of the same amount of oil through increased port 104 as is supplied through inlet 113. With piston 106, however, also valve 112 rises and thus performs a regulating motion, which changes the speed of the prime mover to a value not called for by its operating condition. These atmospheric pressure effects are by no means unappreciable in cases where very exact regulation of the prime mover is required. The provision of cylinder 102 as described entirely shields the delivery port 104 from these atmospheric pressure differences, since within the operating range of the system the oil is discharged through port 104 into a compartment of constant pressure, except for the only momentary pressure variations in chamber 102 while piston 107 rises or drops. This, however, is not the main advantage of cylinder 102.

The function of cylinder 102 and its piston 107 is of great importance when the oil delivered by the regulator pump is utilized for supplying engine bearings and hydraulic servo-motors. If these consumers should for instance suddenly draw more oil, the pressure at port 104 would drop if cylinder 102, piston 107 and auxiliary port 105 were not provided, with the result that without requirement by the operating conditions of the prime mover, piston 106 would respond by dropping to restrict port 104, and thus perform an uncalled for regulating motion to speed up the prime mover. Besides, the restriction of port 104 would lessen the oil supply to the consumers at a time when they require more oil. The presence of cylinder 102, port 105 and piston 107 avoids this, because with increased oil consumption the pressure in cylinder 102 drops, piston 107 is lowered, restricts port 105 and thus diverts more oil into the main outlet 110.

When the oil requirement of the connected consumers is restored to normal, the pressure tends to rise in cylinder 102 and piston 107 again opens port 105 wider and diverts the oil not needed by the consumers.

The motion of the piston 106 thus takes place in this arrangement in correspondence with the increase in delivered quantities Q according to the line c in Fig. 1 of the drawings. The coupling of this piston with the control member 112 thus gives the correct regulation, for instance of the servo-motor which it controls.

Figure 3:
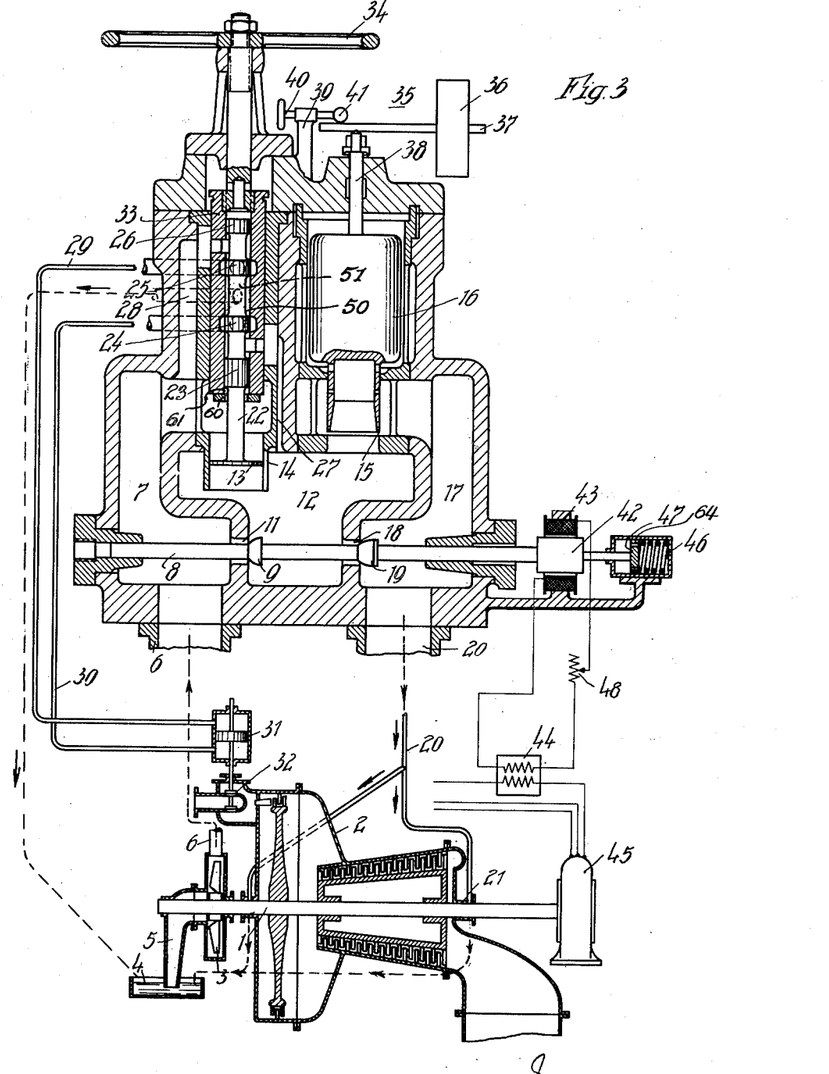

The manner in which the aforedescribed principle may be embodied for example in a pilot system for a prime mover is shown in detail in Fig. 3. In this figure it will be seen that on the shaft 1 of the turbine 2 is mounted a rotary or centrifugal pump 3 which draws a liquid, such as oil, from the tank 4 through the suction branch 5. The quantity of liquid drawn in by the pump is delivered into a chamber 7 by a delivery pipe 6. In this chamber 7 the liquid is divided into two branch streams, one portion of the liquid escaping through the port 11, the passage area of which is adjustable by a conical valve 9 mounted on the shaft 8. To start with, it will be assumed that this passage area is always maintained at a constant value. The dividing off of a branch stream is provided for the following reason. The regulating motion is brought about only by the variations of the quantities above or below a certain normal value. If the total quantity of liquid delivered were sent through the regulating member comparatively large flow areas and correspondingly large masses of the adjusting members would be necessary. Large masses are detrimental to the regulating process since all the masses have to be set in motion and accelerated when initiating the regulating process and an appreciable retardation or time lag could thus not be avoided. By using only a small portion of the total flow for operating the regulating mechanism, as proposed at present, this time lag is reduced to a negligible value. The remainder of the liquid delivered by the pump into chamber 7 which has not escaped through port 11 acts on the top of a piston 13 which varies the passage area of a port 14 giving access to the chamber 12. If the amount of liquid delivered into chamber 7 increases, piston 13 is forced downward, port 14 is enlarged and a passage area for a larger quantity of liquid is formed. The pressure in the chamber 12 is kept constant by the aid of a weight 16. Under the action of this weight an annular port 15 adjusts itself in size, which affords access to the chamber 17 for a portion of the liquid. The larger portion of the liquid passes, however, from the chamber 12 through port 18 into the chamber 17, the passage area of this port being adjustable by the conical valve 19 mounted on the spindle 8 together with valve 9 aforementioned. The liquid discharged from chamber 17 is returned into tank 4 in any conventional manner, for instance serving, on its way through pipe 20, to supply a number of machine lubricating points, such as the bearings 21. Since it is desirable to maintain the constant normal pressure in chamber 7 higher than that in chamber 12, the effective area of the top of piston 13 is made correspondingly smaller than the effective area of its bottom.

The derival from the aforedescribed circulating system of a control force or motion for the adjustment of the main regulating valve of the steam turbine 2 is effected in the following manner, by which a portion of the oil circulated by the pump is used for operating a servo-motor which actuates the main steam valve. If in Fig. 3 the quantity of liquid delivered into chamber 7 has increased, piston 13 will, as described before, move downward and enlarge port 14 sufficiently so that also the surplus quantity of liquid can pass into the chamber 12. The piston 13 is secured to a spindle 22. This spindle carries the valve pistons 23, 24, 25 and 26 slidingly disposed in valve sleeve 33. In the annular chamber between the pistons 23 and 24 prevails the same pressure as in the chamber 12, as both chambers are in communication by a duct 27. In the annular chamber between the pistons 25 and 26 prevails the same pressure as in the chamber 7 because these two spaces are in communication by a duct 28. The annular chamber 50, located between pistons 24 and 25 is permanently connected to a discharge port 51 which leads directly to the storage tank 4. If now the spindle 22 moves downward as aforementioned when the delivery of the pump 3 increases, pistons 23, 24, 25 and 26 participate in this motion. The pistons 24 and 25 cover in their shown position of rest the ports for two pipes 29 and 30 which communicate with the chambers above and below the servo-motor piston 31. The motion of piston 31 adjusts the main regulating valve 32 of the steam turbine 2. When the spindle 22 moves downward as described, the valve piston 25 uncovers the port of pipe 29. In this way a certain quantity of liquid will pass from the chamber 7 through duct 28 into the pipe 29 and to the top of the servo-motor piston 31, which now moves downward under the action of the pressure and imparts a closing motion to the valve 32. At the same time the port for pipe 30 has been opened by piston 24 into chamber 50, and thus the oil below servo-motor piston 31 can escape through port 51 to the outside, and if desired return to tank 4. In consequence of the just mentioned escape of pressure liquid through duct 28 into the servo-motor, which is of appreciable size, the pressure in the chamber 7 will drop rapidly. On account of the existence of a substantially constant pressure in chamber 12, piston 13 will rise again, and in unison with it pistons 23, 24, 25 and 26. After a certain time the ports of pipes 29 and 30 will thus be closed again by their respective pistons and equilibrium will again exist in the regulating device. The process is similar if the pressure in the chamber 7 drops below the normal equilibrium value, for instance if the prime mover should slow down. In this case piston 13 will move upward because, as mentioned hereinbefore, weight 16 tends to maintain the pressure in chamber 12 substantially constant. The piston 24 participating in this movement uncovers the port of pipe 30 and a portion of the pressure liquid contained in the chamber 12 passes through duct 27 and pipe 30 to the bottom of servo-motor piston 31. Simultaneously valve piston 25 in rising establishes communication between pipe 29 and exhaust port 51, and the liquid on top of piston 31 is discharged through pipe 29, and annular chamber 50 and port 51 to the outside, as soon as servo-motor piston 31 moves upward. By this upward movement the passage area of turbine valve 32 is opened further whereby the quantity of steam supplied to the steam turbine 2 is increased. From the foregoing description it will be understood that equilibrium exists whenever the valve pistons 24 and 25 close the respective ports of pipes 29 and 30 completely. Sleeve 33 in which these valve pistons slide, can be adjusted longitudinally by means of a hand wheel 34. If sleeve 33 is moved downward by this hand wheel, the central or neutral position of piston 13, relatively to which it performs the aforedescribed motions is lowered. The immediate effect of this setting upon the regulating mechanism is similar to the aforedescribed effect of piston 13 moving upward with respect to port 14, namely that slide valve piston 24 admits liquid from chamber 12 into pipe 30 which causes the servo-motor piston 31 to further open the turbine valve 32, and to increase the turbine speed. But now, as soon as equilibrium is restored in the manner aforedescribed, the system operates with an enlarged normal size port 14, which means that the entire regulating device has been set for the normal passage of a larger quantity of liquid. Since the quantity of liquid depends upon the speed of the prime mover the ultimate result of this adjustment of the sleeve 33 is that the turbine 2 is now regulated for a higher normal speed. Conversely the normal speed of the turbine is lowered by raising sleeve 33 by means of hand wheel 34.

The provision of supplying pressure fluid for the servo-motor piston 31 from chamber 12 through duct 27 and pipe 30 for its upward movement—for increasing the steam supply—and from chamber 7 through duct 28 and pipe 29 for its downward movement—for decreasing the steam supply—has particular advantages. If the pressure fluid supply for pipes 29 and 30 were derived in common from chamber 12 only, the following would happen when the plant condition calls for regulation: As had been explained before, the pressure in chamber 12 is kept constant by means of weight 16. If in case of increased turbine speed, for instance through lighter load, the concurrently increased pump speed causes an increase in fluid supply, the pressure in chamber 7 tends to increase while in chamber 12 weight 16 tends to keep the pressure constant. This will cause control piston 13 to descend and to furnish pressure fluid through pipe 29 to the servo-motor to close steam valve 32. If now, as assumed above, the required fluid for the servo-motor were supplied from chamber 12, this heavy draft by the servo-motor would rapidly diminish the amount of fluid in this chamber, because through unavoidable sluggishness of the weight 16 its valve would not close down port 15 quick enough to counteract this draft. This would temporarily considerably reduce the pressure in chamber 12, while in chamber 7, due to the higher pump speed the pressure increases rapidly, so that an abnormal, very great temporary pressure difference is established between the two sides of piston 13. This would cause piston 13 to descend much faster than is desirable for uniform and delicate response of the control system and would cause over-regulation. On the other hand, if the turbine load should increase and slown down the turbine speed, the concurrently decreased pump speed would diminish the oil supply to chamber 7 with the result that, assuming normally constant pressure in chamber 12, piston 13 would rise and cause fluid supply through pipe 30 to the servo-motor. If, as assumed, the servo-motor fluid supply again occurs from chamber 12, this time the incidental temporary decrease in pressure in this chamber, if any, goes hand in hand with the aforementioned decreasing pressure in chamber 7. Thus, a comparatively small temporary pressure difference remains between the two sides of piston 13, causing the latter to move upwardly quite slowly as is desirable for sensitive regulation.

To avoid this non-uniform speed of piston 13 for its two directions of movement, the fluid supply for the servo-motor for its steam-valve-closing-direction is furnished from chamber 7 through duct 28, and the supply for the steam-valve-opening-direction from chamber 12 through duct 27. If with such an arrangement the pump speed and thus the pressure in chamber 7 increases temporarily, and piston 13 moves downward and causes fluid supply to pipe 29, this fluid is drawn from a point where excess fluid tends to exist, namely from chamber 7, while the fluid pressure in chamber 12 which is not drawn upon at this time is easily maintained normal by weight 16. Thus only a comparatively small temporary excess pressure exists in chamber 7, and piston 13 moves slowly, the same as it does when for the upward movement of servo-motor piston 31 the fluid is supplied from chamber 12 as aforedescribed, and thus uniform movement of piston 13 in both directions is obtained.

The normal speed of the turbine 2 may also be varied in another manner. It has already been pointed out that the pressure in the chamber 12 is kept normally constant by means of the weight 16. The quantity of liquid flowing through port 14, however, depends not only on the size of its passage area but also on the difference in pressure between the chambers 7 and 12. If the pressure in chamber 12 is increased in any way so that the differential pressure between the chambers 7 and 12 is smaller, the velocity of flow through port 14 is also reduced and therewith the total quantity of liquid passing in a unit of time. To permit pressure variation in chamber 12 for adjustment purposes, a certain additional load is provided which in its entirety is indicated in Fig. 3 by the reference numeral 35. It consists of a weight 36 mounted on a lever 37. This lever rests upon the spindle 38 which is connected with the weight 16. The pivotal point of lever 37 can be shifted. For this purpose an axially displaceable spindle 40, provided with a hand wheel at one end and a spherical abutment 41 at the other end, is journaled in a bracket 39. The spherical end 41 of this spindle forms the abutment or pivotal point for lever 37 which point can thus be shifted with respect to the point of application to spindle 38. The momentum exerted by the weight 36 upon spindle 38 varies according to the location of this end 41. This varies the additional load acting on the weight 16. Additional weights might also be placed on the spindle 38. This provision would, however, not permit of such a sensitive regulation as the variation of the leverage by the aforedescribed means.

The regulator Fig. 3 operates as follows: Let us assume first that turbine 2 runs at the desired speed. At that time the movable elements of the regulator are in equilibrium, i. e. the normal pressure balance exists between chambers 7 and 12 which would maintain piston 13 in a floating position in which the slide valves 24, 25 close their ports which lead to the servo-motor supply pipes 29 and 30, and to exhaust port 51. If now the turbine speed increases, the pump increases its delivery of oil into chamber 7. This increased amount of oil has for its escape only the normally fixed port 11 and the normally adjusted area of port 14. The latter being insufficient to take care of the added amount of oil, the pressure in chamber 7 temporarily rises, so that piston 13 is depressed until port 14 assumes a size which will accommodate the increased flow. Owing to the increased flow into chamber 12 its pressure also increases momentarily until weight 16 has been lifted sufficiently to widen port 15 to take care of the increased flow whereupon the pressure in chambers 7 and 12 drops back each to its normal value with an increased oil flow through the chambers. The essential, remaining change is the lower position of piston 13. In this new piston position, piston valve 25 has opened its port to supply pressure oil from chamber 7 to servo-motor pipe 29 by which the steam supply to the turbine is now restricted in the manner described. At the same time piston valve 24 releases the oil from the lower side of the servo-motor piston through pipe 30 and port 51 also in the manner described.

The turbine speed is thus reduced, the pump delivers less oil into chamber 7, so that the pressure in the latter momentarily drops, less oil is thus delivered through port 14 into chamber 12, the pressure momentarily drops in the latter so that weight 16 restricts the discharge port 15 which restores the pressure in chamber 12 to normal. Thereby piston 13 is pushed upward until port 14 assumes the commensurate size as explained before, valves 24 and 25 re-close their ports and the regulator comes to rest in its original position of equilibrium. In case the turbine speed drops below the normal value, less oil is delivered into chamber 7 and the reverse motion of the slide valves 24 and 25 occurs which brings about the reverse motion of the servo-motor, by which the turbine valve 32 is opened further to restore the turbine speed to normal, whereafter the pressures in chambers 7 and 12 readjust themselves back to normal similar to the manner described, and the regulator again comes to rest in its original position of equilibrium.

At the begining of the description of Fig. 3 it was stated that the passage areas 11 and 18 should be imagined for the time as being constant. In the present modification the cones 9 and 19, however, can be adjusted in accordance with the output of the power plant. Such an arrangement is of special importance if a prime mover delivers energy into a consumer's network subject to sudden great load fluctuations. If great load variations occur, the regulating process can start under the aforedescribed operating conditions only after the load variation has manifested itself by an increase or reduction in speed of the prime mover. The regulation will thus generally lag behind the load variation. Disagreeable disturbances may thus occur, particularly in three-phase current networks. For this reason a device is provided by means of which sudden load variations can be met by a response and action of the regulating device before the load variation is able to manifest itself in a variation of the speed. For this purpose valve spindle 8 is provided which carries at one end the armature 42 of a solenoid coil 43, which latter is energized from the generator 45 through a current transformer 44. The generator 45 is driven by the turbine 2. When the load of the generator 45 rises, the current supplied to solenoid 43 by the current transformer 44 also increases. The regulating process must take place in such a manner that an increased supply of driving medium to the turbine 2 is coordinated to the increased load. The valve cone 9 must thus move toward the right and uncover a larger passage area at 11. In this way a larger quantity of liquid flows from the chamber 7 into the chamber 12 without flowing through port 14. The normally existing pressure difference between chambers 7 and 12, which holds piston 13 in the normal, neutral position shown, is disturbed by this increased flow at 11, the pressure in chamber 7 will momentarily decrease and bring about a rise of piston 13 and piston valve 24 into a position in which oil is supplied through pipe 30 to servo-motor piston 31 which increases the supply of steam to the turbine 2. Conversely the cone 9 would, in case of a sudden reduction of the load of the generator 45, have to be moved toward the left at the decrease of the solenoid coil current below normal. For this purpose is provided a spring 46 controlling a piston 47. If in case of a low current in the current transformer 44 the electromagnetic force in the coil 43 is reduced the spindle 8 will move towards the left under the action of the spring 46. Simultaneously with valve 9, valve 19 is also further opened or closed as the case may be. This function of valve 19 does not defeat, however, the purpose of the operation of valve 9 aforedescribed for the following reasons: The ports 11 and 18 are provided, as described before, for the purpose of arranging the throttle openings 14 and 15 as a by-pass for the main oil current which flows from chamber 7 by way of port 11 through chamber 12 and out through port 18. This by-pass arrangement is made for the purpose of leading only a small quantity of oil by way of the variable ports 14 and 15, in order to make the arrangement more sensitive, because in accordance with the decreased amount of oil, also small control ports can be provided at 14 and 15. As a consequence of the recognition that the parallel arrangement of two oil currents would make it possible to very effectively operate the control mechanism described hereinbefore, it was further found that by introducing a valve 9 in cooperation with port 11, the piston 13 could be very quickly controlled at sudden load variations in the manner described. Since one of the prerequisites of the entire arrangement is to keep the pressure in chamber 12 substantially constant, and since the purpose of moving valve 9 is to quickly unbalance the equilibrium between chambers 7 and 12 by varying the pressure in chamber 7 only, the main outlet port 18 of chamber 12 must be varied together with port 11 in the same sense. Now if for instance with the further opening of port 18, together with port 11, by means of the solenoid action, the pressure in chamber 12 would at first tend to drop, weight 16 which controls port 15 of chamber 12 would immediately respond and move downward, thereby reducing the size of port 15 until the pressure in chamber 12 is restored to its normal value.

The sensitiveness of the solenoid 43 may be varied by hand by means of a resistance 48. By increasing the resistance the normal speed of the turbine 2 may be reduced, by reducing the resistance the speed may be increased.

By suitably dimensioning the size of vent 64 provided in piston 47 the movement of valves 9 and 19 may be damped to a sufficient extent to prevent unduly fast movement at only slight load variations with the accompanying undesired over regulation.

In order to avoid over regulation by excessive movements of the other control valves of the system, in particular in case of sudden great load fluctuations, a further damping device should be provided in such an arrangement. The system illustrated in Fig. 3, and as described in the foregoing, contains two control elements for the liquid, already described, the quantity control valve 13 and the pressure control valve 16. Both of these valves are hydraulically coupled, and thus the damping of one valve is likely to react upon the other valve. Since the effect of a damping device depends upon the mass of the object to be damped, it is preferable in the present arrangement, in order to avoid such undue reaction, that the comparatively light valve 13 with its small control piston valves 23—26 be damped instead of valve 16 which, as described, constitutes a heavy weight. In order to damp piston 13 a disc 60 is attached to the lower end of sleeve 33 through which disc spindle 22 passes with a substantial amount of clearance to allow liquid to be drawn into the annular space 61 beneath piston valve 23 when the latter moves upward, and to be expelled from this space when it moves downward. By properly designing the aforementioned clearance between disc 60 and spindle 22 the desired degree of damping of this entire control valve mechanism can be brought about to avoid over regulation in case of sudden excessive load fluctuations. Of course, any other equivalent damping device of conventional form may be substituted.

Figure 4:
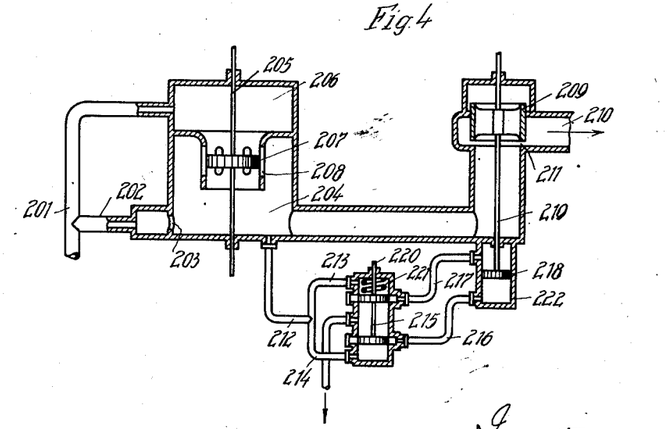

In Fig. 4 of the drawings is diagrammatically shown how a given delivery head of liquid may be maintained by other means than by a loading weight. A portion of the liquid delivered by the rotary pump is conveyed into the chamber 206 above the piston 207 by the pipe 201. The other, considerable portion passes through the branch pipe 202 and the orifice 203 into the chamber 204. The chambers 204 and 206 communicate with each other by slots 208, provided in a central sleeve in which piston 207 is slidingly disposed. The size of the passage area results from the prevailing position of piston 207. The position of this piston varies with the quantity of liquid delivered by the pump at the time. The connection of the piston rod 205 with the control member for the prime mover regulation is not shown in detail in this illustration. It will be understood, however, that it may be similar to valve gear 22—26 shown in Fig. 3. The pressure in chamber 204 must normally be kept constant. For this purpose a control piston 209 is provided, the position of which determines at any time the sectional area of the annular port 211 leading to the discharge pipe 210. The adjustment of the control piston 209 is made by a servo-motor piston 218 which is connected with the control piston 209 by a piston rod 219. This servo-motor piston reciprocates in a cylinder 222, and is operated in accordance with the pressure prevailing in the chamber 204 at the time. The pressure liquid required for the operation is likewise derived from the chamber 204. It first passes into a supply pipe 212 which branches into the pipes 213 and 214. The pipe 213 leads into the space above the upper valve piston of the control slide 215 while the pipe 214 opens into the space below the lower valve piston of the control slide 215. The valve pistons are of equal size. The control slide would thus be in equilibrium. The piston rod which connects the two valve pistons extends, however, beyond the upper valve and passes through the upper end of cylinder 220. For this reason the effective area of the upper valve piston is smaller than that of the lower. The pressures exerted are thus different and the control slide has the tendency to ascend under the action of the differential pressure. This ascent is counteracted by a spring 221. Only when the pressure in the chamber 204 has risen to such an extent that the differential pressure overcomes the spring, the control slide 215 moves upward and uncovers the pipe 216. In this way a certain quantity of pressure liquid can pass below the servo-motor piston 218 and move it upward. Annular port 211 is thus enlarged and the pressure in the chamber 204 thus reduced.

If the pressure in the chamber 204 drops below a given value the strength of the spring 221 overcomes the differential pressure and forces the control slide 215 downward. In this way the pipe 217 is put in communication with the pipe 213 and pressure liquid is forced into the space above servo-motor piston 218. Under the action of the pressure liquid piston 218 moves downward and reduces the area of port 211. With such a device it is thus possible to maintain the pressure in the chamber 204 permanently at a given value. The sensitiveness of the adjustment depends upon the strength of the spring 221. The choice of the spring also determines the normal speed for which the prime mover is to be regulated.

Various modifications and changes may be made without departing from the spirit and the scope of the invention.

I claim:—

1. In a hydraulic regulating device for machines in combination, a machine to be regulated, a member for regulating the machine, a rotary pump driven by said machine at a fixed speed ratio, a chamber connected to the delivery side of said pump, a second chamber and a port between said two chambers, said second chamber having means for keeping the pressure of the liquid delivered through said port into it substantially constant, means responsive to the varying quantities of liquid delivered by said pump for correspondingly varying the passage area of said port, and a connection between said quantity responsive means and said regulating member for actuating said member.

2. In a hydraulic regulating device for machines in combination, a machine to be regulated, a member for regulating the machine, a rotary pump driven by said machine at a fixed speed ratio, a chamber connected to the delivery side of said pump, a second chamber having a pressure responsive discharge valve device in said second chamber for keeping the pressure of the liquid delivered into said second chamber substantially constant, a port between said two chambers, means responsive to the varying quantities of liquid delivered by said pump for correspondingly varying the passage area of said port, and a connection between said quantity responsive means and said regulating member for actuating said member.

3. In a hydraulic regulating device for machines in combination, a machine to be regulated, a member for regulating the machine, a rotary pump driven by said machine at a fixed speed ratio, a chamber connected to the delivery side of said pump, a second chamber having a pressure responsive discharge valve device in said second chamber for keeping the pressure of the liquid delivered into said second chamber substantially constant, and means for varying the response of said valve device to vary the pressure to be maintained in said chamber, a port between said two chambers, means responsive to the varying quantities of liquid delivered by said pump for correspondingly varying the passage area of said port, and a connection between said quantity responsive means and said regulating member for actuating said member.

4. In a hydraulic regulating device for machines in combination, a machine to be regulated, a member for regulating the machine, a rotary pump driven by said machine at a fixed speed ratio, a chamber connected to the delivery side of said pump, a second chamber having a weight-controlled discharge valve in said second chamber for keeping the pressure of the liquid delivered into said chamber substantially constant, and means for varying said weight to vary the liquid pressure to be maintained, a port between said two chambers, means responsive to the varying quantities of liquid delivered by said pump for correspondingly varying the passage area of said port, and a connection between said quantity responsive means and said regulating member for actuating said member.

5. In a hydraulic regulating device for machines in combination, a machine to be regulated, a member for regulating the machine, a rotary pump driven by said machine at a fixed speed ratio, a chamber connected to the delivery side of said pump, a second chamber having a weight-controlled discharge valve in said second chamber for keeping the pressure of the liquid delivered into said chamber substantially constant, and a lever carrying a weight at one end and being applied to said valve intermediate its ends and having a fulcrum at its other end, variable with respect to the point of lever application, to vary the liquid pressure to be maintained in said second chamber, a port between said two chambers, means responsive to the varying quantities of liquid delivered by said pump for correspondingly varying the passage area of said port, and a connection between said quantity responsive means and said regulating member for actuating said member.

6. In a hydraulic regulating device for machines in combination, a machine to be regulated, a member for regulating the machine, a rotary pump driven by said machine at a fixed speed ratio, a chamber connected to the delivery side of said pump, a second chamber having means for keeping the pressure of the liquid delivered into said chamber substantially constant, a port between said two chambers, means responsive to the varying quantities of liquid delivered by said pump for correspondingly varying the passage area of said port, and a connection between said quantity responsive means and said regulating member for actuating said member, and a second port between said two chambers forming a passage for the liquid in parallel to the first-mentioned port.

7. In a hydraulic regulating device for machines in combination, a machine to be regulated, a member for regulating the machine, a rotary pump driven by said machine at a fixed speed ratio, a chamber connected to the delivery side of said pump, a second chamber having means for keeping the pressure of the liquid delivered into said chamber substantially constant, a port between said two chambers, means responsive to the varying quantities of liquid delivered by said pump for correspondingly varying the passage area of said port, and a connection between said quantity responsive means and said regulating member for actuating said member, a second port between said two chambers, and means for varying the passage area of said second port.

8. In a hydraulic regulating device for machines in combination, a machine to be regulated, a member for regulating the machine, a rotary pump driven by said machine at a fixed speed ratio, a chamber connected to the delivery side of said pump, a second chamber having means for keeping the pressure of the liquid delivered into said chamber substantially constant, a port between said two chambers, means responsive to the varying quantities of liquid delivered by said pump for correspondingly varying the passage area of said port, and a connection between said quantity responsive means and said regulating member for actuating said member, a second port between said two chambers, and a valve device responsive to the load variations of the machine for varying the passage area of said second port.

9. In a hydraulic regulating device for machines in combination, a machine to be regulated, a member for regulating the machine, a rotary pump driven by said machine at a fixed speed ratio, a chamber connected to the delivery side of said pump, a second chamber having a port leading to the first chamber and having a discharge port and means in said discharge port for keeping the pressure of the liquid delivered into said second chamber substantially constant, means responsive to the varying quantities of liquid delivered by said pump into the first chamber, for correspondingly varying the passage area of the port between said two chambers, and a connection between said quantity responsive means and said regulating member for actuating said member, a second port between said two chambers, and a second discharge port for said second chamber and means for simultaneously varying the passage areas of said two last-named ports.

10. In a hydraulic regulating device for machines in combination, a machine to be regulated, a member for regulating the machine, a rotary pump driven by said machine at a fixed speed ratio, a chamber connected to the delivery side of said pump, a second chamber having a port leading to the first chamber and having a discharge port and means in said discharge port for keeping the pressure of the liquid delivered into said second chamber substantially constant, means responsive to the varying quantities of liquid delivered by said pump into the first chamber, for correspondingly varying the passage area of the port between said two chambers, and a connection between said quantity responsive means and said regulating member for actuating said member, a second port between said two chambers, and a second discharge port for said second chamber and a valve device for said two last-named ports, directly responsive to the load variations of the machine for varying the passage area of said two last-named ports in accordance with said load variations.

11. In a hydraulic regulating device for machines in combination, a machine to be regulated and having a control element, a hydraulic servo-motor having a piston for operating said control element, for increasing and decreasing the machine speed, a slide valve controller for said motor piston adapted to admit pressure fluid above or below the piston to vary the machine speed, a rotary pump driven by said machine at a fixed speed ratio, a chamber connected to the delivery side of said pump, a second chamber having a port connection with said first chamber and having means for keeping the pressure of the liquid delivered through said port into said second chamber substantially constant, a valve movably disposed in said port and responsive to the varying quantities of liquid delivered by said pump into the first chamber, for correspondingly varying the passage area of said port, a connection between said port valve and the slide valve controller for said servo-motor, to operate said controller in accordance with the varying liquid quantities delivered into the first chamber, a liquid supply duct from said first chamber to the portion of said slide valve controller which supplies pressure liquid to the servo-motor for its machine speed-decreasing operation, and a liquid supply duct from said second chamber to the portion of said valve controller which supplies pressure liquid to the servo-motor for its machine speed-increasing operation.

12. In a hydraulic regulating device for machines in combination, a machine to be regulated and having a control element, a hydraulic servo-motor having a piston for operating said control element, for increasing and decreasing the machine speed, a slide valve controller for said motor piston adapted to admit pressure fluid above or below the piston to vary the machine speed, a rotary pump driven by said machine at a fixed speed ratio, a chamber connected to the delivery side of said pump, a second chamber having a port connection with said first chamber and having means for keeping the pressure of the liquid delivered through said port into said second chamber substantially constant, a valve movably disposed in said port and responsive to the varying quantities of liquid, different from the normal quantity, delivered by said pump into the first chamber, for correspondingly varying the passage area of said port, a connection between said port valve and the slide valve controller for said servo-motor to operate said controller in accordance with the varying liquid quantities delivered into the first chamber, a liquid supply duct from said first chamber to the portion of said slide valve controller which supplies pressure liquid to the servo-motor for its machine speed-decreasing operation, and a liquid supply duct from said second chamber to the portion of said valve controller which supplies pressure liquid to the servo-motor for its machine speed-increasing operation, and means for varying the neutral position of said slide valve controller with respect to the prevailing normal position of said port valve in its port at normal liquid supply from the pump, to vary the normal port valve position, for adjusting a different normal machine speed.

13. In a hydraulic regulating device for machines in combination, a machine to be regulated and having a control element, a hydraulic servo-motor having a piston for operating said control element, for increasing and decreasing the machine speed, a slide valve controller for said motor piston adapted to admit pressure fluid above or below the piston to vary the machine speed, a rotary pump driven by said machine at a fixed speed ratio, a chamber connected to the delivery side of said pump, a second chamber having a port connection with said first chamber and having means for keeping the pressure of the liquid delivered through said port into said second chamber substantially constant, a valve movably disposed in said port and responsive to the varying quantities of liquid, different from the normal quantity, delivered by said pump into the first chamber, for correspondingly varying the passage area of said port, a connection between said port valve and the slide valve controller for said servo-motor to operate said controller in accordance with the varying liquid quantities delivered into the first chamber, a liquid supply duct from said first chamber to the portion of said slide valve controller which supplies pressure liquid to the servo-motor for its machine speed-decreasing operation, and a liquid supply duct from said second chamber to the portion of said valve controller which supplies pressure liquid to the servo-motor for its machine speed-increasing operation, and a control sleeve forming the guide for said slide valve controller and containing the cooperating control ports for said valve controller through which the liquid is supplied to said servo-motor, and means for adjusting said sleeve for varying the neutral position of said controller with respect to the prevailing normal position of said port valve in its port at normal liquid supply from the pump, to vary the normal port valve position, for adjusting a different normal machine speed.

In testimony whereof I affix my signature.

GUSTAV KÖHLER.